United States Patent [19]

Forsythe et al.

[11] Patent Number: 4,569,428

[45] Date of Patent: Feb. 11, 1986

[54] ACTUATOR FOR FRICTION COUPLING

[75] Inventors: Bobbie G. Forsythe; Charles R. Burkmire, both of Wichita Falls, Tex.

[73] Assignee: Dana Corporation, Toledo, Ohio

[21] Appl. No.: 460,968

[22] Filed: Jan. 25, 1983

[51] Int. Cl.$^4$ .............................................. F16D 25/04
[52] U.S. Cl. ........................................ 192/70; 92/100; 192/70.28; 192/85 AB; 192/88 A; 192/113 A
[58] Field of Search ............... 192/70, 70.13, 70.28, 192/88 A, 85 AB, 113 A; 188/71.3, 71.4, 72.4, 72.5, 370; 92/99, 91, 92, 96, 100

[56] References Cited

U.S. PATENT DOCUMENTS

| | | | |
|---|---|---|---|
| 598,766 | 2/1898 | Campany | 92/91 X |
| 1,385,378 | 7/1921 | Knaak | 92/91 |
| 1,776,288 | 9/1930 | Livingston | 92/92 |
| 1,909,744 | 5/1933 | Berg | 188/71.4 |
| 2,106,472 | 1/1938 | Aikman | 192/85 AB |
| 2,178,490 | 10/1939 | Nielsen | 92/92 |
| 2,386,478 | 10/1945 | Kraft | 64/11 |
| 2,621,769 | 12/1952 | Cardwell et al. | 192/88 A |
| 2,785,781 | 3/1957 | Johansen | 192/12 |
| 2,956,650 | 10/1960 | Wilson | 188/264 |
| 3,237,738 | 3/1966 | Suppes et al. | 192/70 |
| 3,311,205 | 3/1967 | Suppes et al. | 192/70 |
| 3,444,966 | 5/1969 | Braukhoff | 192/113 A X |
| 3,584,717 | 6/1971 | Suppes et al. | 192/70 |
| 3,696,900 | 10/1972 | Montalvo | 192/70 |
| 3,882,972 | 5/1975 | Newstead et al. | 188/72.5 |
| 3,964,583 | 6/1976 | Montalvo | 192/85 AA |
| 4,366,884 | 1/1983 | Montalvo | 192/88 A X |

*Primary Examiner*—Rodney H. Bonck
*Attorney, Agent, or Firm*—F. B. McDonald

[57] ABSTRACT

A friction coupling apparatus contains a plurality of fluid motor actuators circumferentially fixed about a relatively rotatable shaft. Each of the actuators is positioned between a spaced pair of friction rotors fixed to the shaft for rotation therewith. The actuators each contain an annular axially distensible elastomeric air tube, which upon pressurization operates to force pairs of friction members against the rotors for establishing frictional communication between the shaft and a relatively fixed support member. In a preferred embodiment, the elastomeric air tube contains a pair of axially spaced apertures. Each aperture defines a circumferential sealing edge by which one of a pair of air pistons is supported. Each piston contains a circumferential groove which sealingly mates with one of the edges, the pistons positioned to bear directly against the friction members.

14 Claims, 4 Drawing Figures

ACTUATOR FOR FRICTION COUPLING

BACKGROUND OF THE INVENTION

This invention relates to friction coupling apparatus such as industrial air cooled clutches and brakes. More particularly, the invention relates to fluid motor actuators utilized in the control of such apparatus.

Prior art industrial clutches and brakes of the air-cooled type, including tension brakes, have traditionally employed thin-walled elastomeric actuators, generally of two piece casings comprising mating pairs of diaphragms. Such thin-walled multi-piece elastomeric members have not only been more difficult to install, but have been relatively susceptible to puncture by their support members. The latter has resulted in costly field failures, as the equipment involved is generally quite large, and typically moves massive amounts of material.

Another drawback of the prior art actuators for friction coupling apparatus is a general difficulty of access to the friction members associated therewith. Thus, many of such devices require substantial down time including disassembly of major portions of the equipment to merely change friction linings. Although a few of such devices have incorporated provisions requiring less disassembly, for example swing arms, the latter improvements are still not entirely satisfactory.

Finally, the conventional rotor members associated with prior art actuators have lacked efficient cooling media, most including only fins over their external rotor boundaries. Thus, the prior art has also been deficient in providing pneumatic actuators which are cooled satisfactorily.

SUMMARY OF THE INVENTION

The invention disclosed herein provides a unitary elastomeric actuator member for providing rugged, durable pneumatic operation of friction coupling apparatus. Moreover, the invention provides for improved access to the friction members associated with the actuators and utilized in the clutching or braking actions as required. Finally, the invention provides an improved cooling of the internal parts intermediate the rotor members.

In a preferred embodiment, the apparatus includes a plurality of fluid motor actuators, each incorporating an axially distensible elastomeric air tube. Each air tube is encased between a mateable pair of free-floating air tube carrier halves mounted on axially extending support studs, the latter permitting only axial movement of the halves in response to pressurization of the air tube. Each air tube includes a pair of air pistons mounted in side apertures therein, the pistons bearing against friction members for direct actuation of the latter members. Retraction springs extend through each pair of carrier halves to draw the halves together upon depressurization of each associated air tube.

DETAILED DESCRIPTION OF A PREFERRED EMBODIMENT

Figure 1:
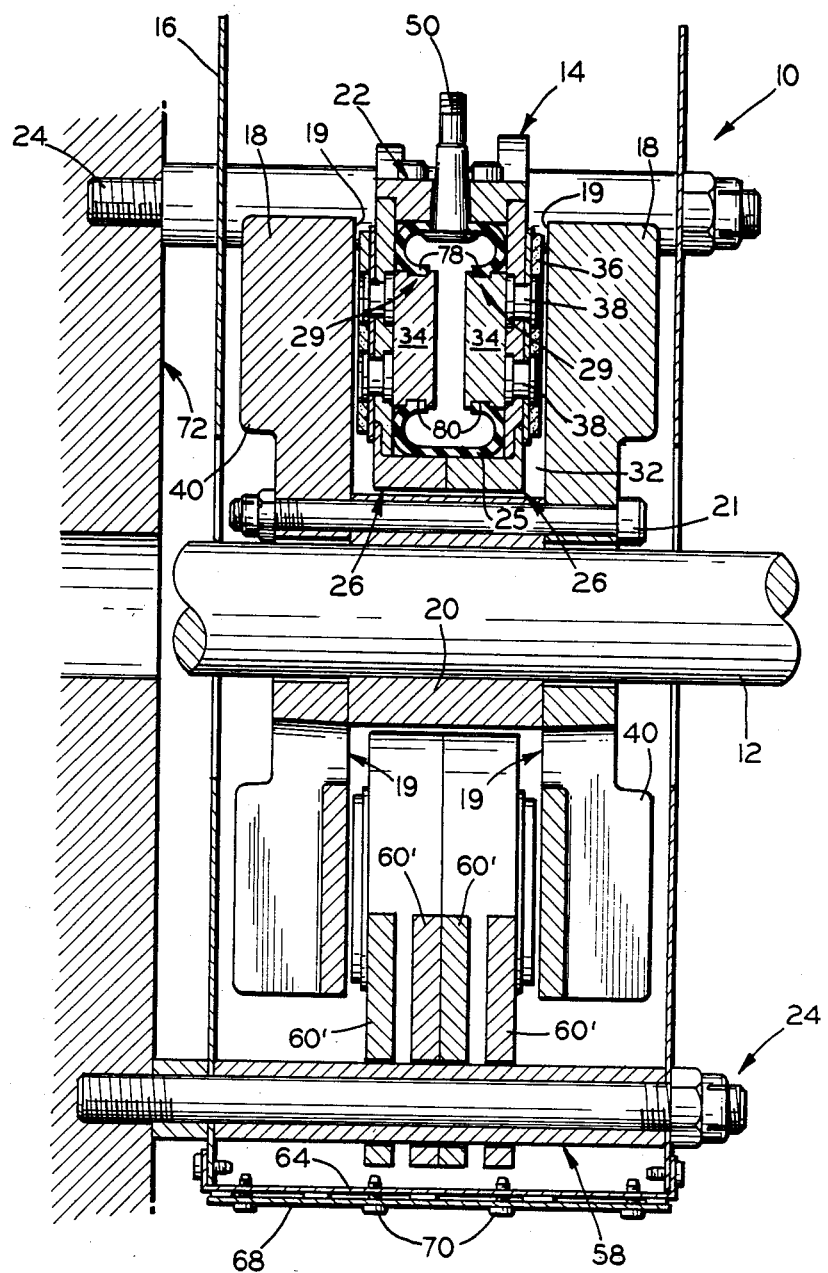
FIG. 1 is an end sectional elevation of a preferred embodiment of a friction coupling apparatus which incorporates the present invention.
Figure 2:
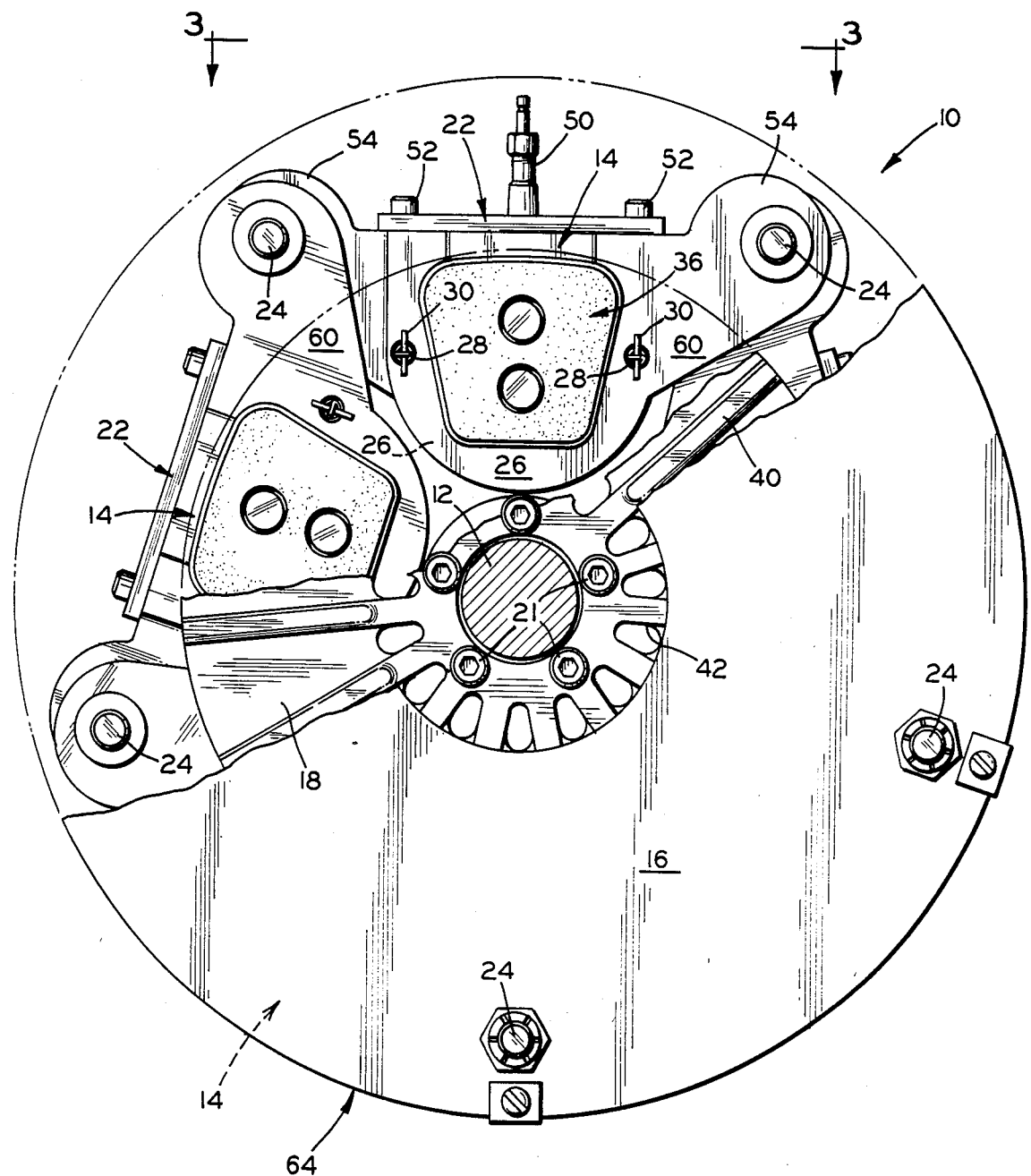
FIG. 2 is a side elevation with portions of a protective side plate and underlying friction rotor cut away to reveal fluid motor actuated friction assemblies circumferentially fixed about a rotatable shaft.

An air actuated friction coupling mechanism 10 is shown in FIGS. 1 and 2. As herein described, such a mechanism 10 contemplates a preferred use as a tension brake in apparatus utilized in the wrapping and unwinding of sheet materials. The mechanism 10 includes a plurality of fluid motor actuated friction assemblies 14 which are fixed circumferentially about a rotatable shaft 12 as shown. The fluid motor assemblies 14 are axially encased between inwardly opposed, axially spaced faces 19 of a pair of rotatable friction rotors 18 which are secured to the shaft 12 by means of bolts 21 which extend through a bolt sleeve 20, keyed to the shaft 12. Positioned axially outwardly of both friction rotors are protective side plates 16, which in most industrial situations are normally either suggested or required for safety from the rotating friction rotors 18.

Figure 3:
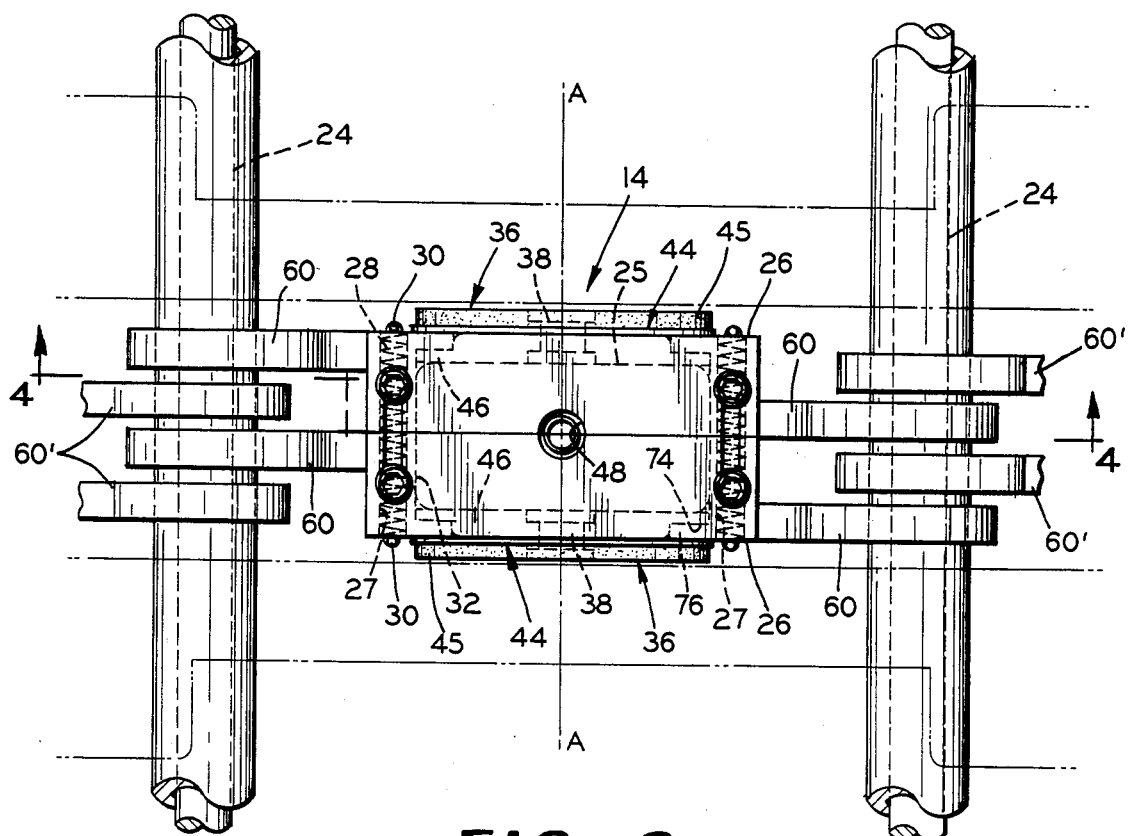
FIG. 3 is a sectional view directed radially inwardly of the apparatus along lines 3—3 of FIG. 2, showing detail of one of the fluid motor assemblies of FIG. 2.

Referring to FIGS. 2 and 3, each fluid motor assembly 14 includes a pair of axially spaced friction members 36, each comprising a pressure plate 46, a backing plate 44 and a friction lining 45 bonded to the backing plate. Although as herein described each friction member is formed of an assembly of separate elements, other embodiments may be suitably employed instead. For example, where a particular friction lining is of a thickness and/or material which possesses sufficient strength, the backing plate may in some instances be eliminated. Alternatively it is conceivable that a friction member could be fabricated solely of a friction material wherein the separate elements would all be formed as a single unit composite.

Each fluid motor assembly 14 includes an air tube 25 which supports a pair of air pistons 34 (shown only in FIG. 1). As the air tube 25 is pressurized the pistons 34 are forced apart and bear against the friction members 36. The spaced members 36 are thereby thrust axially outwardly apart and against respective friction rotors 18 for establishing frictional communication between relatively rotatable members; in this case the shaft 12 and a stationary housing 72. It will be apparent that each fluid motor assembly 14 is secured to the stationary member 72 by means of stationary mounting studs 24 which will be further described hereinafter.

Figure 4:
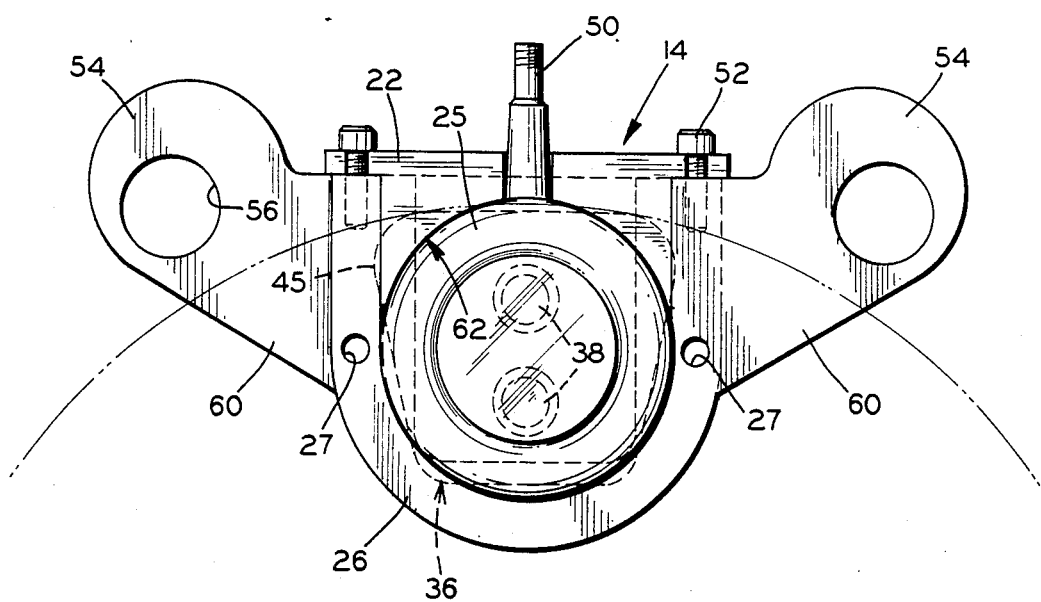
FIG. 4 is a sectional side view of the fluid motor assembly shown in FIG. 3.

Referring now to FIGS. 3 and 4, each friction assembly 14 includes a pair of free-floating mateable air tube carrier halves 26, held together by retraction springs 28, preferably coil springs under constant tensile load. Locking pins 30 are positioned through each end of the springs 28. As apparent, the springs extend through bores 27 through the sides of each mating carrier half. Each pair of carrier halves 26 contains one air tube 25, which is made of an elastomeric relatively thick-walled doughnut-shaped, unitary body, and is of a thickness to be self supporting or free-standing when depressurized, or when opposing sides of its walls are subjected to atmospheric pressure. For example, a preferred wall thickness of an air tube 25 having an external overall diameter of three (3) inches would be 90 to 150 thousandths of an inch.

Referring back to FIG. 1, each air tube 25 includes a pair of side apertures 29, the apertures defining radially inwardly extending, axially spaced sealing edges 78. The edges provide support for the pair of axially disposed air pistons 34, each containing a circumferential groove 80 for sealingly mating with one of the edges 78. In the preferred embodiment, the apertures are circular, and the unstressed diameter of each aperture 29 is smaller than the diameter of an associated piston groove 80. It will be seen that upon pressurization, the air pistons will move axially apart from each other and will thus act to separate the free-floating carrier halves 26 against tension of the springs 28.

Each carrier half 26 includes a radially outwardly slidable riveted friction assembly previously referred to as a friction member 36. As was noted, each friction member 36 of the presently described embodiment includes a pressure plate 46, a backing plate 44 and a friction lining 45. Rivets 38 extend through the latter aforesaid members to hold them together. Each fluid motor assembly 14 thus includes an opposed pair of pressure plates, which along with the radially disposed internal surfaces of the carrier halves, together define a cavity 32 for each air tube 25. The cavity is enclosed by two readily removable air tube cap halves 22 (FIGS. 1 and 2), which are each contoured (see FIG. 4) with an inner surface 62 which mates with the radially external body portion of one contained air tube 25. Removal of the cap halves 22 provides relatively simple access to the friction and air tube members. The cap halves are normally retained to respective carrier halves 26 by machine screws 52 or other suitable means, and thus also move axially apart under pressurization of each associated air tube 25.

Referring particularly to FIG. 3, upon depressurization of the pluralities of air tubes 25, it will be seen that the retraction springs 28 of each assembly 14 will operate to pull the friction members 36 axially inwardly and away from frictional communication with the rotatable friction rotors 18. For purposes of allowing the sliding of the latter friction members 36 radially outwardly for removal and replacement, the pressure plates 46 are stepped so that when riveted each pressure plate is spaced from its associated backing plate. The latter spacing defines a groove 74, which receives a tongue 76, one tongue extending radially inwardly of, and integral with, each carrier housing half 26. Thus, the tongue and groove mating character of the friction members 36 with the carrier housing halves 26 provides for an axially fixed, yet slidably removable relationship between each friction member and its associated carrier half. The result is a servicing and/or replacement convenience which has not been heretofore available in the prior art.

Referring again particularly to FIG. 3, it will be apparent that the latter is a view of a fluid motor assembly with the air tube cap halves 22 removed. It will also be apparent that as each air tube 25 expands along axis A—A under pressurization, the air pistons 34 (shown only in FIG. 1) will be caused to move axially outwardly, thereby contacting the pressure plates 46 on either side. Since the pressure plates 46 are riveted to backing plates 44 and friction linings 45, the expansion of each air tube 25 will result in axial separation of the latter-defined friction members 36, which as noted are conveniently slidably retained in the carrier halves 26. Since each friction member 36 is axially fixed with respect to each carrier half 26, those skilled in the art will appreciate that as each air tube body is pressurized, its axial distension will also cause associated carrier halves 26 to axially separate apart from each other. Upon depressurization of the air tube, the springs 28 will retract the two halves together, carrying associated friction members therewith.

Referring now to FIG. 4, each carrier half 26 includes a pair of attachment yokes 54 for the radially fixed, axially free-floating mounting of each fluid motor actuator assembly 14. Each attachment yoke 54 contains a yoke aperture 56 through which a stud sleeve 58 (FIG. 1) is received for support thereof. It will thus be appreciated that the mounting studs 24 and overlying mounting stud sleeves 58 provide the entire support of the fluid motor actuators as detailed and described herein. It will also be appreciated that the attachment yokes 54 are mounted on the ends of yoke arms 60, thus presenting an array of staggered pairs of yoke arms 60 between actuators 14 (FIG. 3), as the use of staggered yoke arms 60 will allow for unrestricted and free-floating relative axial movements of adjacent yoke arms 60' attached to adjacent fluid motor assemblies.

Referring to FIGS. 1, 3 and 4, a valve stem assembly 50 extends radially inwardly into each of the air tubes 25 of each fluid motor assembly 14. Means, not shown, are provided for simultaneously pressurizing and depressurizing the plurality of assemblies 14 so that they operate in concert.

Radially surrounding the air actuated friction coupling mechanism 10 is a protective annular shroud 64 (FIGS. 1 and 2). The shroud as shown is in a plurality of portions, each retained by hold-down straps 68 which are secured to the shroud 64 by screws 70 (FIG. 1). Alternatively, a hinged shroud design may be employed.

As the preferred embodiment of the air actuated friction coupling mechanism described herein contemplates use as an air actuated brake, the shaft 12 is in frictional communication with a stationary support member 72, as earlier noted. The securement of the mechanism 10 to the stationary support 72 is by means of the mounting studs 24, which also secure the protective side plates 16 on both sides of the pair of rotors 18.

Finally, the rotors 18 include conventional fins 40 for enhancing cooling of the friction rotors 18 during braking operations. The rotors are made of conventional materials which accommodate high heat loads. However, the preferred embodiment of the present invention also provides a plurality of apertures 42 which extend axially and completely through each rotor 18 for providing enhanced cooling of the interior portion of the mechanism 10. The apertures 42 are circumferentially positioned radially inwardly of the finned area of each rotor 18 in the preferred embodiment.

Although the preferred embodiment as herein described includes numerous features and capabilities which distinguish over the prior art, neither the drawings nor the description are dispositive of the many variants which fall under the appended claims.

What is claimed is:

1. In a friction coupling for selectively transmitting and controlling torque between a pair of relatively rotatable bodies having a common axis, the first of said bodies including two parallel friction rotors having opposed, axially spaced faces, said rotors concentrically positioned about said common axis, the second of said bodies including a pair of axially spaced friction members positioned interjacently with respect to said rotors and radially outwardly of said axis of rotation, and means for forcing said friction members apart and into contact with said faces of said rotors; an improvement comprising: a fluid motor actuator including an annular axially distensible unitary elastomeric element having a pair of apertures defining axially spaced sealing edges, said actuator further including a pair of axially disposed air pistons, each piston defining a circumferential groove wherein one of each of said edges of said apertures is sealingly disposed within one of said grooves.

2. The fluid motor actuator of claim 1 further comprising a pair of mating carrier halves, each half for supporting one of said pair of axially spaced friction members.

3. The fluid motor actuator of claim 2 wherein said friction members each comprise a pressure plate, a backing plate, and a friction lining fixed to said backing plate, and an axial space between said backing plate and said pressure plate, each of said pressure plates interjacent one of said air pistons and an associate backing plate, each pressure plate riveted to said associated backing plate and associated lining.

4. The fluid motor actuator of claim 3 wherein said axial space between said backing plate and said pressure plate defines a peripheral groove about each of said riveted members, and wherein an associated carrier half defines a radially inwardly extending tongue which mates with said groove, whereby each of said riveted members is axially retained relative to said associated carrier half.

5. The fluid motor actuator of claim 4 further comprising a pair of air tube cap halves positioned at the radially outward most portion of said pair of carrier halves.

6. The fluid motor actuator of claim 5 further comprising an actuator cavity, and wherein said elastomeric element and said air pistons are disposed within said actuator cavity, said cavity bounded by said pressure plates and said air tube cap.

7. The fluid motor actuator of claim 6 wherein said groove and said tongue are positioned radially inwardly of said cap halves, whereby upon removal of said cap halves, said friction members may be radially removed from said carrier halves.

8. The fluid motor actuator of claim 7 wherein said carrier halves have a plurality of axially extending bores therethrough, the bores of one carrier half in mating communication with the bores of the other, and wherein said spring means comprise coil springs under tensile load, one of said springs extending through each pair of said communicating bores, and pins at each end of said spring for fixing respective spring ends relative to each carrier half.

9. The fluid motor actuator of claim 8 wherein the spaced openings in said axially distensible elastomeric annular unitary element have unstressed diameters which are smaller than the diameters of the circumferential grooves of said air pistons.

10. The fluid motor actuator of claim 9 wherein said annular distensible elastomeric element comprises walls having a thickness of an amount great enough that the body is self-supporting when opposing sides of said walls are subjected to atmospheric pressure.

11. An air actuated friction coupling mechanism for selectively transmitting and controlling torque between a pair of relatively rotatable bodies having a common axis, a first of said bodies including two parallel friction rotors having inwardly opposed axially spaced faces, said rotors concentrically positioned about said axis, a second of said bodies including a pair of friction members interjacently positioned with respect to said rotors and spaced radially outwardly of said axis of rotation, means for simultaneously forcing said friction members apart from each other and into contact with said opposed faces of said rotors, and a fluid motor actuator including an annular axially distensible, unitary elastomeric element having a pair of apertures defining axially spaced sealing edges, said actuator further including a pair of axially disposed air pistons, each piston circumferentially supported in one of said edges, each piston having a circumferential groove thereabout, wherein one of each of said edges of said apertures is sealingly disposed within one of said grooves.

12. The air actuated friction coupling of claim 1 comprising a circumferentially positioned plurality of said fluid motor actuators, each positioned on pairs of radially opposed yokes, said yokes extending from one actuator unit to the next on staggered yoke arms.

13. The air actuated friction coupling of claim 12 further comprising a plurality of radially extending cooling fins on the opposing outside surfaces of said rotatable friction rotors.

14. The air actuated friction coupling of claim 13 further comprising a plurality of cooling apertures axially extending through said friction rotors radially inwardly of said fins.

* * * * *